United States Patent
Grantz et al.

[11] Patent Number: 5,938,343
[45] Date of Patent: Aug. 17, 1999

[54] OIL FILLING SEAL FOR HYDRODYNAMIC MOTOR UTILIZING A MOVABLE SEALING ELEMENT

[75] Inventors: Alan L. Grantz, Aptos; Klaus Kloeppel, Watsonville; John Dunfield, Santa Cruz, all of Calif.

[73] Assignee: Seagate Technology, Inc., Scotts Valley, Calif.

[21] Appl. No.: 08/963,565

[22] Filed: Nov. 3, 1997

Related U.S. Application Data

[63] Continuation of application No. 08/551,000, Oct. 31, 1995, abandoned.

[51] Int. Cl.[6] ............................. F16C 33/72; F16C 32/06
[52] U.S. Cl. ........................ 384/152; 384/100; 384/114; 384/119
[58] Field of Search ..................... 384/114, 119, 384/152, 100, 396; 277/105, 165, 188 R; 360/98.07, 99.08; 310/90

[56] References Cited

U.S. PATENT DOCUMENTS

| | | | |
|---|---|---|---|
| 984,460 | 2/1911 | Zwosta et al. | 277/188 R |
| 1,215,314 | 2/1917 | Siegfried | 384/100 X |
| 3,294,408 | 12/1966 | Smith | 277/188 R |
| 3,393,917 | 7/1968 | Kendall et al. | 277/165 |
| 3,762,778 | 10/1973 | Boggs et al. | 384/396 X |
| 4,540,221 | 9/1985 | Frazer | 384/119 X |
| 5,357,163 | 10/1994 | Minakuchi et al. | 310/90 |
| 5,396,134 | 3/1995 | Mochizuki | 310/90 X |
| 5,403,098 | 4/1995 | Yasui et al. | 384/119 X |
| 5,524,986 | 6/1996 | Leuthold et al. | 384/119 |

FOREIGN PATENT DOCUMENTS

| | | | |
|---|---|---|---|
| 173471 | 7/1989 | Japan | 360/98.07 |
| 700589 | 12/1953 | United Kingdom | 384/119 |

*Primary Examiner*—Daniel P. Stodola
*Assistant Examiner*—Gregory J. Strimbu
*Attorney, Agent, or Firm*—Flehr Hohbach Test Albritton & Herbert LLP

[57] ABSTRACT

A rotating shaft motor or cartridge incorporates an o-ring which surrounds the rotating shaft and is borne on a carrier. As supported on the carrier, the o-ring does not normally block the bearing passages which would prevent the smooth distribution of oil throughout the motor. However, the carrier and o-ring combination are designed to allow the o-ring to be forced into an opening between the shaft and sleeve for completely sealing the remaining portion of the bearing during filling. The rotating shaft includes a central reservoir, having one or more grooves or passages communicating with the hydrodynamic bearing surfaces and ending in a septum or rubber plug which is inserted in an opening in the shaft.

8 Claims, 3 Drawing Sheets

OIL FILLING SEAL FOR HYDRODYNAMIC MOTOR UTILIZING A MOVABLE SEALING ELEMENT

This is a continuation of application Ser. No. 08/551,000 filed Oct. 31, 1995, now abandoned.

FIELD OF THE INVENTION

The present invention relates to the field of hydrodynamic bearing assemblies of the type which provide support during rotation for a high speed spindle element. More specifically, the present invention relates to improved method and apparatus for filling a hydrodynamic bearing.

RELATED APPLICATIONS

The present invention is related to U.S. application Ser. No. 08/503,568 filed Jul. 18, 1995, now U.S. Pat. No. 5,601,125, assigned to the assignee of the present application and incorporated herein by reference.

BACKGROUND OF THE INVENTION

Disc drive memory systems have been used in computers for many years for storage of digital information. Information is recorded on concentric memory tracks of a magnetic disc medium, the actual information being stored in the form of magnetic transitions within the medium. The discs themselves are rotatably mounted on a spindle, the information being accessed by means of transducers located on a pivoting arm which moves radially over the surface of the disc. The read/write heads or transducers must be accurately aligned with the storage tracks on the disc to ensure proper reading and writing of information; thus the discs must be rotationally stable.

During operation, the discs are rotated at very high speeds within an enclosed housing by means of an electric motor which is generally located inside the hub or below the discs. One type of motor in common use is known as an in-hub or in-spindle motor. Such in-spindle motors typically have a spindle mounted by means of two ball bearing systems to a motor shaft disposed in the center of the hub. One of the bearings is typically located near the top of the spindle, and the other near the bottom. These bearings allow for rotational movement between the shaft and hub, while maintaining accurate alignment of the spindle to the shaft. The bearings themselves are normally lubricated by grease or oil.

The conventional bearing system described above, however, is prone to several shortcomings. First is the problem of vibration generated by the balls rolling on the raceways. Ball bearings used in hard disc drive spindles run under conditions that generally guarantee physical contact between raceway and ball, in spite of the lubrication layer provided by the bearing oil or grease. Hence, bearing balls running on the generally smooth but microscopically uneven and rough raceways; the bearings transmit this surface structure as well as their imperfection in sphericity in the form of vibration to the rotating disc. This vibration results in misalignment between the data tracks and the read/write transducer. This source of vibration limits the data track density and the overall performance of the disc drive system.

Another problem is related to the application of hard disc drives in portable computer equipment, resulting in severely increased requirements for shock resistance. Shocks create relative acceleration between the discs and the drive casing which in turn show up as a force across the bearing system. Since the contact surfaces in ball bearings are very small, the resulting contact pressures may exceed the yield strength of the bearing material, and leave long term deformation and damage to the raceway and the balls of the ball bearing.

Moreover, mechanical bearings are not easily scaleable to smaller dimensions. This is a significant drawback since the tendency in the disc drive industry has been to continually shrink the physical dimensions of the disc drive unit.

As an alternative to conventional ball bearing spindle systems, researchers have concentrated much of their efforts on developing a hydrodynamic bearing. In these types of systems, lubricating fluid—either gas or liquid—functions as the actual bearing surface between a stationary base or housing in the rotating spindle or rotating hub of the motor. For example, liquid lubricants comprising oil, more complex ferro-magnetic fluids or even air have been utilized in hydrodynamic bearing systems. The reason for the popularity of the use of air is the importance of avoiding the outgassing of contaminants into the sealed area of the head/disc housing. However, air does not provide the lubricating qualities of oil. The high viscosity of oil allows for larger bearing gaps and therefore greater tolerances to achieve similar dynamic performance.

Thus, in the case of a hydrodynamic bearing employing a liquid lubricant, the lubricating liquid must be reliably loaded into the bearing in order to maximize the load bearing capacity of the bearing. It is especially important to avoid the presence of any air bubbles within the oil carrying region of the bearing. With maximum oil fill in the hydrodynamic bearing, a stiffer motor is created.

The absence of air bubbles will minimize the pressure build-up inside the motor due to drops in ambient pressure and/or thermal expansion from increased temperature. This is due to the fact that while air bubbles will expand with changes in pressure or temperature, oil has little change in volume with such changes.

As little as 10% air in a typical fluid bearing could theoretically cause leakage through the seals at the ends of the bearings if the bearing is being stored at 70° C. Such failure of the bearing to contain the lubricant would cause contaminants to be expelled into the head disc region of the disc drive. The loss of some bearing fluid could cause the physical surfaces of the spindle and housing to contact one another, leading to increased wear and eventual failure of the bearing system.

Known techniques for filling the hydrodynamic bearing with oil require that the motor be capped after filling, i.e. that the entry channel for injecting the oil or other fluid into the bearing be closed and sealed after the oil is inserted. This is a difficult and complex process which easily results in the entrapment of air.

In view of the many long term benefits of a reliable hydrodynamic bearing design, the establishment of a reliable process for injecting fluid into the hydrodynamic bearing without allowing the entrapment of any air is highly desirable.

SUMMARY OF THE INVENTION

It is therefore an objective of the present invention to provide a fill technique for hydrodynamic bearings which is simple and reliable and adaptable to mass production techniques.

It is a further objective to provide such a process which results on a repeatable basis of the injection of the desired amount of oil or other fluid into the hydrodynamic bearing without entrapping any bubbles into the fluid.

A further objective of the invention is to provide a method and apparatus for sealing an end of the motor while the fluid is added to a motor or bearing cartridge using a rotating shaft.

These and other objectives of the present invention are accomplished by assembling the rotating shaft motor or cartridge and incorporating an o-ring which surrounds the rotating shaft and is borne on a carrier. As supported on the carrier, the o-ring does not normally block the bearing passages which would prevent the smooth distribution of oil throughout the motor. However, the carrier and o-ring combination are designed to allow the o-ring to be forced into place between the rotatable hub shaft and sleeve for completely sealing the remaining portion of the bearing during filling. The rotating shaft itself includes a central reservoir, having one or more grooves or passages communicating with the hydrodynamic bearing surfaces and ending in a septum or rubber plug which is inserted in the bottom of the shaft.

To fill the hydrodynamic bearing, the o-ring is pressed into place, an oil filling needle is inserted through the septum, and the motor is filled with a lubricating fluid in a vacuum chamber. Typically, the motor, needle and a container for oil are placed in a vacuum chamber which is evacuated. The resulting pressure differential causes the air within the motor to exit through the needle and up through the oil. After the air is withdrawn from the motor, the vacuum chamber pressure is slowly returned to ambient pressure, causing oil to flow up through the needle into a vacuum which is now created in the bearing.

The method may be utilized with either a partially or fully assembled motor, and is useful with hydrodynamic bearing of many designs. The method is explained below with reference to a particular motor model with which has provided especially useful. However, the scope of the present invention is not limited to its utilization with this single motor model.

Other features and advantages of the present invention will become apparent to a person of skill in the art who studies the following detailed description of the embodiment of a method and apparatus for the present invention, given in conjunction with the accompanying drawings.

DETAILED DESCRIPTION OF A PREFERRED EMBODIMENT

Figure 1:
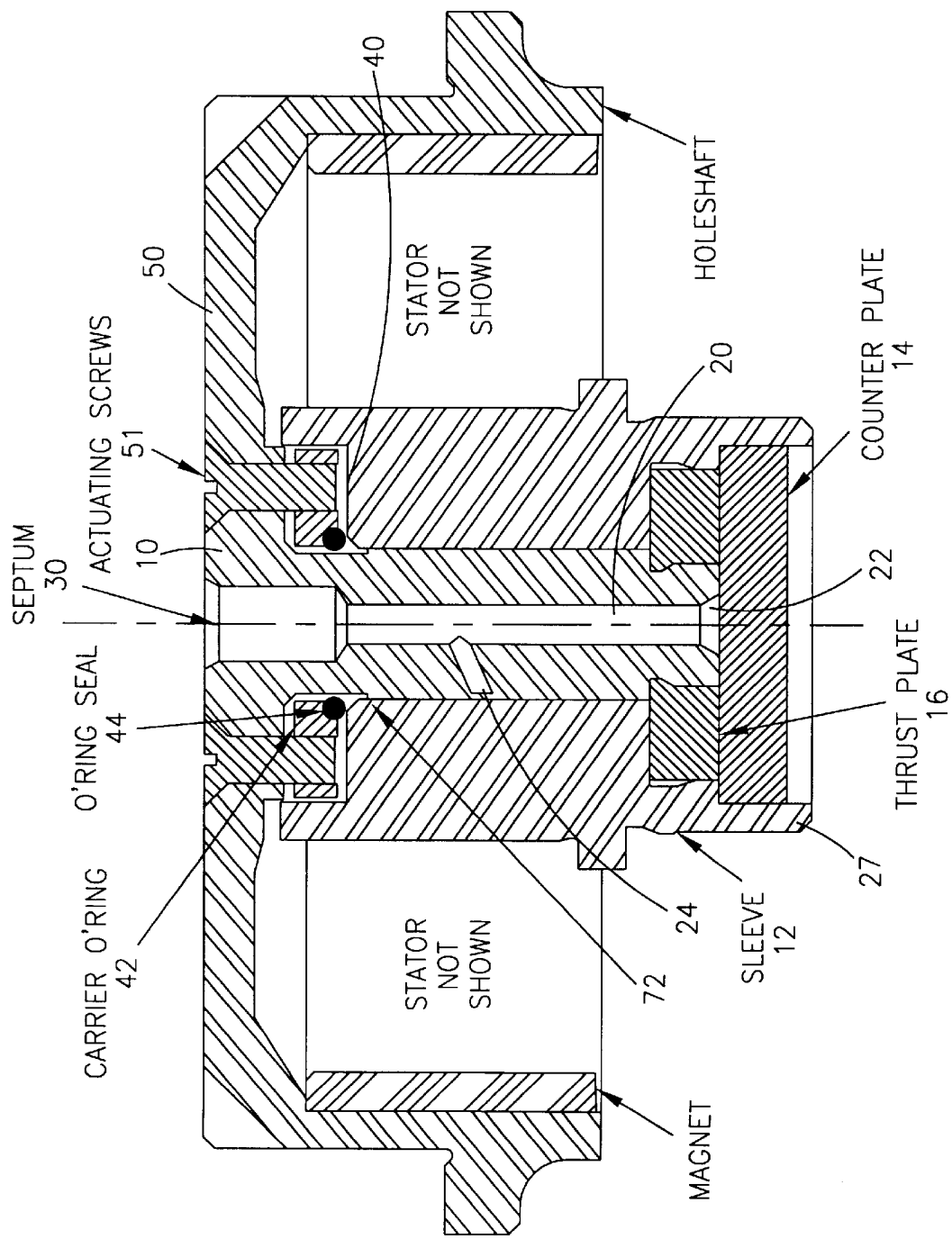
FIG. 1 is a vertical sectional view of a typical rotating shaft hydrodynamic bearing motor with which the present invention is useful.

The description to follow of a preferred embodiment of the present invention teaches a highly efficient vacuum fill technique for inserting a lubricating oil into a hydrodynamic bearing incorporating a rotating shaft rotating within a stationary sleeve. In the specific example which is shown, the hydrodynamic bearing is shown incorporated into a spindle motor for a hard disc drive. However, the technique is useful in any hydrodynamic bearing or hydrodynamic bearing cartridge which is of a structure incorporating a rotating shaft and which can be adapted to have an airtight seal around the entire bearing or bearing cartridge volume.

Hydrodynamic bearings have many uses other than in hard disc drives and this invention is not intended to be limited to uses in such an environment. However, the method and apparatus disclosed herein is especially useful in hydrodynamic bearings for hard disc drives because of the importance of reliably sealing the lubricating groove or region during filling without having any residual fluid either leak out of the motor or being expelled from the bearing over the entire life of the bearing, as such would contaminate the atmosphere within the hard disc drive with droplets or outgassing. It is always a major concern in the design of a hydrodynamic disc drive spindle motor to ensure that the lubricant or fluid is confined to the region where it lubricates the rotating surfaces, and does not migrate to the regions where the data storing discs are located.

The basic principals of the invention will now be explained with respect to a hydrodynamic bearing incorporating a rotating shaft and whose structure is shown generally in FIG. 1. The basic structure of the motor shown herein in FIG. 1 includes a rotating shaft 10 which rotates within a sleeve 12. The rotating shaft terminates at a counterplate 14, and the same end of the shaft rotates within a thrust plate 16. One of the two opposing surfaces of the rotating shaft and sleeve, as well as of the thrust plate 16 and sleeve 12 each carry sections of spiral grooves as is well known in this technology. These grooves are used to distribute the fluid which flows between these relatively rotating surfaces, and to build up the desirable pressure distributions between the surfaces to maintain the stability of the system.

The lubricating fluid is supplied to the lubricated surfaces from a reservoir 20 which runs through the center of the shaft 10. The reservoir supplies fluid both through its terminal end 22 and through passage 24 to the outer surfaces of the rotating shaft 10 and to the surfaces of the counterplate and to the thrustplate. The number and location of these lubricating surfaces is not significant to this invention; what is important is that they are in communication with the reservoir 20 in which the fluid is inserted during and after the filling process, so that the fluid can be properly distributed to each and all of these surfaces to maintain the lubrication of these relatively rotating surfaces.

The reservoir in the center bore of the motor ends in a septum 30 which is an elastomeric plug which creates an airtight seal at or across an access hole which is in direct communication between the outside of the hydrodynamic bearing cartridge and the fluid carrying region or reservoir of the hydrodynamic bearing.

As well be discussed in further detail below, the bearing volume is to be filled by putting the entire bearing cartridge or motor in a vacuum chamber and utilizing vacuum replacement principals to refill the bearing volume. The septum 30 across the end of the reservoir 20 creates a vacuum tight seal at one end of the bearing volume. The counterplate 14 inserted in the shoulder 27 of the sleeve 12 also creates an airtight seal around the other portion of the volume. The region of the bearing volume where the rotating shaft rotates inside the sleeve wall must also be temporarily sealed during the filling of the bearing in order to completely establish a vacuum within the critical regions of the hydrodynamic bearing. This invention is especially concerned with providing means for sealing this end of the hydrodynamic bearing, temporarily, during the vacuum filling process. To this end, at the region 52 where the sleeve tapers away from the rotating shaft 10 to define a shoulder 40, a carrier 42 is provided for a sealing o-ring 44. By forcing the carrier 42 downward toward the shoulder 40, the o-ring is forced into the region between sleeve 12 and shaft 10, sealing that end of the hydrodynamic bearing. This process is described in considerable detail in the above-incorporated Parsoneault application which is incorporated herein by reference.

Basically the steps include inserting a hypodermic needle or equivalent path for fluid into the reservoir 20 through the septum 30. The motor or cartridge, needle, and a reservoir of oil which is connected through the needle to the reservoir are placed in a vacuum chamber. The chamber is evacuated to a substantially reduced pressure and in a preferred embodiment, the temperature of the chamber is increased. During the evacuation process, the air within the motor expands. Due to the differences in pressure, the air exits through the needle and bubbles up through the oil. After the bearing or bearing cartridge is evacuated of air, the cycle is reversed and the vacuum pressure chamber is slowly returned to normal atmospheric pressure. This forces oil through the needle into the hydrodynamic bearing in the motor. Since the motor has been sealed by the septum which is permanently in place and by the o-ring which has been forced into place between the rotating shaft and the sleeve, the oil replaces the now evacuated air and fills every region within the hydrodynamic bearing. This completely and effectively fills the bearing in a bubble free operation.

The cartridge is now removed from the vacuum chamber and the needle is withdrawn. The o-ring can now be removed from the region between the shaft and the sleeve, leaving the shaft free to turn relative to the sleeve.

The remainder of FIG. 1 and the following figures will now be reviewed with respect to teaching some optimum approaches for forcing the o-ring seal on a temporary basis into the region between the sleeve and the rotating shaft.

Reviewing first what is shown in FIG. 1, a plurality of actuating screws 51 (three, four, or six) are provided through the top of the hub 50 which rotates with the shaft 10 and threaded into the o-ring carrier 42. The sealing o-ring 44 is bonded to or molded into the carrier which may itself be made of a number of different materials including but not limited to bronze, brass, steel, molded plastic, and various elastomers. In order to push the o-ring 44 down into sealing region 52, between the sleeve and shaft, the screws 51 are partially unthreaded from the o-ring carrier; by pushing down on the screws, the o-ring carrier 42 pushes the o-ring against the rotating hub/shaft and sleeve, completely sealing the top portion of the bearing for the duration of the filling process. The sealing region includes a tapered surface 72 of the sleeve 12. The vacuum process is then carried out; and once the vacuum is established, inside the motor, and the filling process is started, the sealed o-ring will tend to stay in place. The sealing ring can easily be withdrawn once the process is completed by rethreading the actuating screws into the carrier, withdrawing the o-ring 44 to a position at a distance from the sealing region 52 so that the hub and rotating shaft can rotate freely relative to the sleeve.

Figure 2:
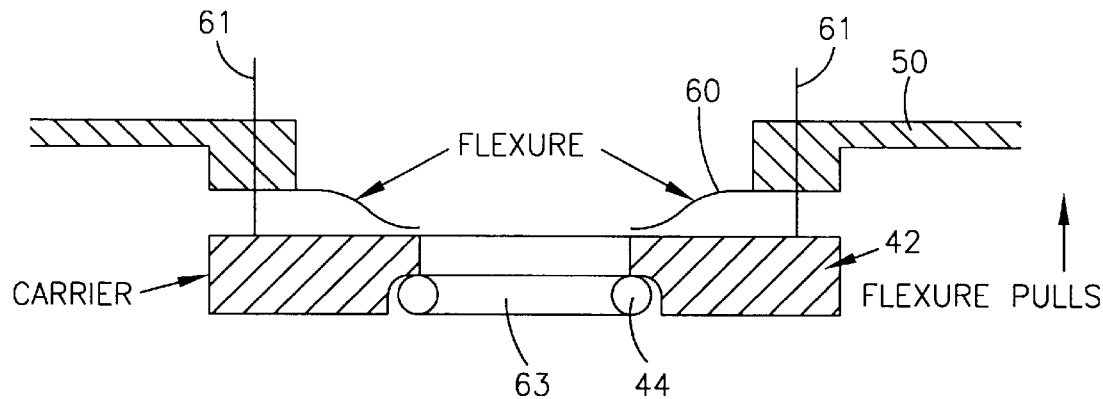
FIG. 2 is a vertical sectional view of an alternative embodiment for the o-ring and carrier used for sealing the bearing groove in the method described with respect to FIG. 1.

In a first alternative embodiment of FIG. 2, the carrier o-ring 42 which supports the seal 44 is mounted from the hub 50 by a flexure 60 made of a known, flexible material. The flexure 60 would normally hold the o-ring and carrier in a retracted position, preferably in a detent groove 63. Pins 61 which penetrate the hub could then push down and hold the carrier and o-ring in the sealing position during the vacuum filling. The holding force of the pins would obviously be supplemented by the fact that as described above, once a vacuum is established, the o-ring remains in place under the force of the vacuum.

Figure 3:
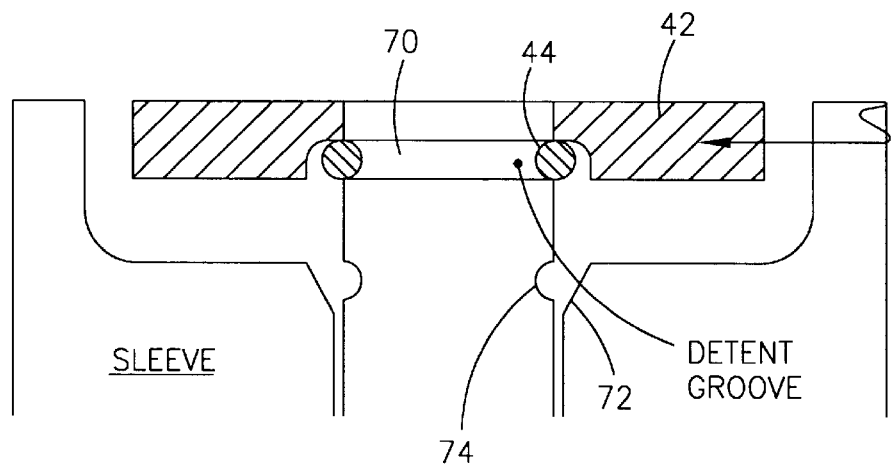
FIG. 3 is a further alternative embodiment of a carrier, o-ring, and rotating shaft which are especially useful in forming the hydrodynamic motor of the present invention.

A further alternative to the carrier and o-ring combination is shown in FIG. 3. In this figure, the o-ring carrier 42 is shown supporting the o-ring seal 44 in a detent groove 70 formed on the outside of the rotating shaft. During normal operation of the motor or cartridge, the o-ring and its carrier will simply rotate with the rotating shaft 71, with the groove eliminating the possibility of the o-ring slipping into the gap between shaft and sleeve and hindering rotation of the shaft. As is known in the technology and described in the Leuthold application incorporated above, a recess is typically provided at the head of the hydrodynamic bearing where the shaft tapers at 72; an indentation 74 is typically incorporated into the rotating shaft to prevent the lubricating fluid from dispersing out of the hydrodynamic bearing. Thus, during the filling procedure, the pins described above with respect to FIG. 2, or screws described with respect to FIG. 1 would be used to push the carrier 42 and the o-ring 44 down into the sealing position filling and closing off the gap between shaft and sleeve, establishing the necessary vacuum. When the process is completed, the o-ring and carrier would be moved back into the detent groove 70 where it would remain permanently withdrawn from any possible interference.

Figure 4A:
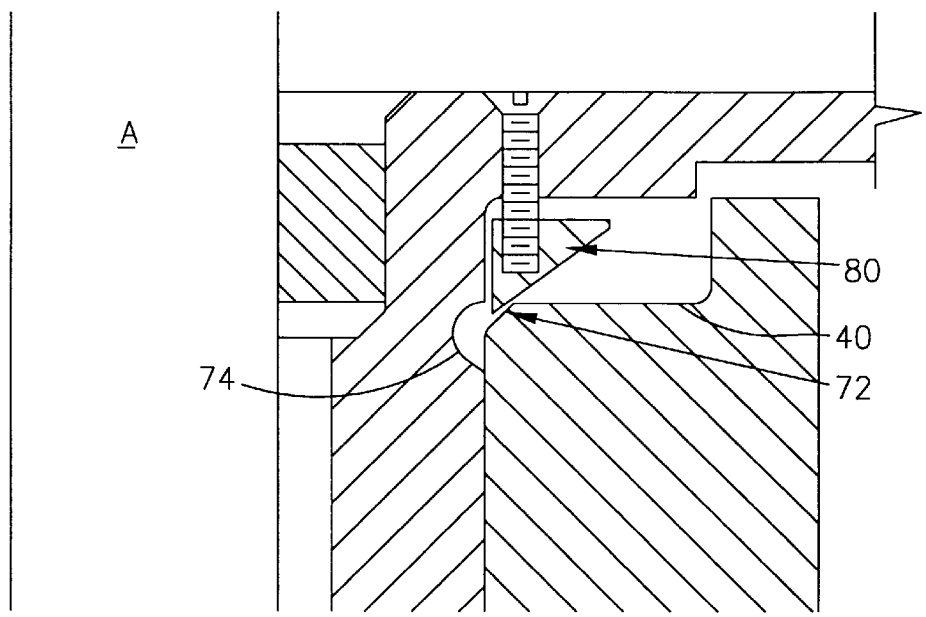
FIG. 4A is further alternative embodiment of a seal which is useful in sealing the bearing groove during filling of the hydrodynamic bearing.
Figure 4B:
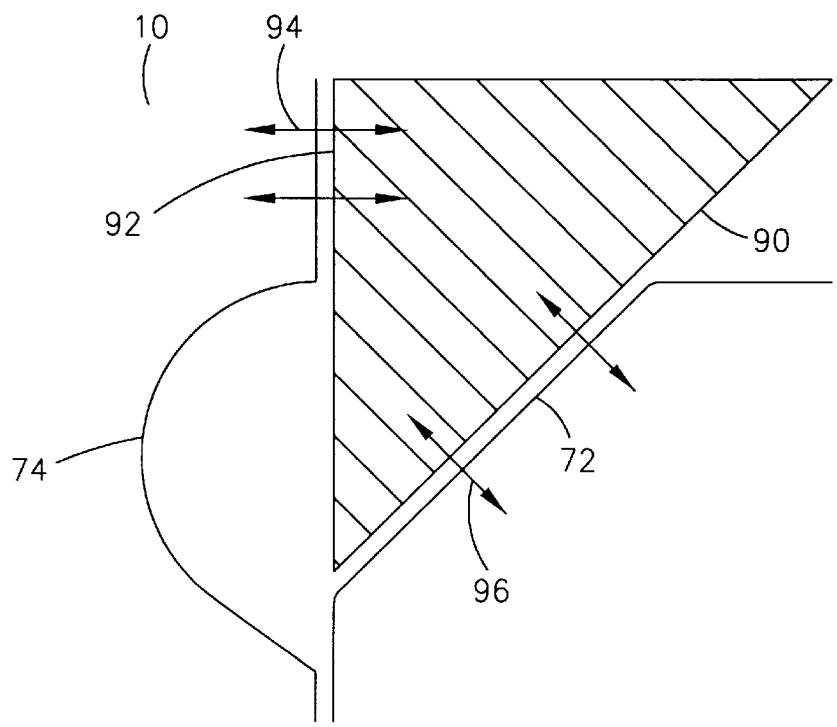
FIG. 4B shows an embodiment of means for sealing the groove between a rotating shaft and surrounding stationary sleeve in a hydrodynamic bearing during the filling process.

Further alternative embodiments utilizing a wedge seal are shown in FIGS. 4A and 4B. These embodiments take advantage of the fact that as described with respect to FIG. 3, the tapered surface 72 is defined at the end of the sleeve between the vertical section of the sleeve which directly faces the rotating shaft and the shoulder 40. In a manner having similarities to FIG. 1, but without utilizing an o-ring, a wedge shaped seal may be made from a hard elastomer or plastic which will seal against the edge of the seal which is already defined at the end of the shaft and sleeve between tapered surface 72 and recess 74. This wedge shaped seal made of hard elastomer or plastic may be screwed down into place using screws which are threaded through the top of the hub and into the top of the wedge shaped seal in a manner similar to FIG. 1. As shown in FIG. 4A, it is not necessary that the wedge shaped seal have an angle which matches the angle of the tapered surface 72. In this embodiment, the wedge shaped seal 80 should be made of a flexible material so that the seal is optimized; it may even carry a small o-ring as an integral part so that the sealing function is optimized.

Alternatively, as shown in FIG. 4B, the wedge could be forced into the recess with the wedge having an outer incline surface 90 with an angle matching the tapered surface 72 of the seal at the end of the hydrodynamic bearing, on the opposite side a vertical surface 92 matching the verticality of the rotating shaft 10. This will result in high surface forces/sealing pressure as represented by arrows 94, 96 optimizing the sealing function which is to be achieved during the filling process. This design would also work with a metal sealing member, and is not limited to elastomers, plastics, or other materials. It would optimally be moved into place and withdrawn using screws threaded through the hub and into the top of the wedge as explained with reference to FIG. 1.

Other features and advantages of the invention will become apparent to a person of skill in the art who studies the present invention disclosure. The scope of the present invention is not intended to be limited to the examples given in the above written description and figures, but is intended to be limited only by the following claims.

What is claimed is:

1. A hydrodynamic bearing comprising a rotating shaft and a stationary sleeve surrounding said shaft, said shaft and said sleeve defining a gap therebetween having fluid therein for supporting free rotation of said shaft with respect to said sleeve, said shaft including a hub, said hub extending radially outwardly from said shaft over said gap and an axial end of said sleeve, an oil filling seal including a carrier surrounding an axial length of said shaft adjacent an opening between said shaft and said sleeve and an o-ring seal carried by said carrier and adapted to seal said opening and thus said gap between said shaft and said sleeve, and a plurality of screws threadably connected to said carrier for controllably moving said carrier and said o-ring seal toward and away from said opening, said screws supported by said hub, disposed around said shaft and rotatable with said hub.

2. A bearing as claimed in claim 1 wherein said screws extend through said hub.

3. A bearing as claimed in claim 2 wherein movement of said screws moves said carrier toward and away from said opening.

4. A bearing as claimed in claim 2 wherein said rotating shaft further includes a detent groove formed in an outer surface of said shaft axially spaced from an end of said bearing and from said opening, said screws acting on said carrier to move said o-ring from said detent groove into said opening to seal said gap during filling of said bearing.

5. A bearing as claimed in claim 1 wherein said sleeve extends parallel to said shaft and further includes a tapered surface adjacent said opening and a shoulder which is perpendicular to said rotating shaft, said tapered surface extending between said gap and said shoulder and facing a recess in said rotating shaft.

6. A hydrodynamic bearing comprising a rotating shaft and a stationary sleeve surrounding said shaft, said shaft and said sleeve defining a gap therebetween having fluid therein for supporting free rotation of said shaft with respect to said sleeve, said shaft including a hub, said hub extending radially outwardly from said shaft over said gap and an axial end of said sleeve, an oil filling seal surrounding an axial length of said shaft adjacent an opening between said shaft and said sleeve, said seal adapted to seal said opening and thus said gap between said shaft and said sleeve, and a plurality of screws threadably connected to said seal for controllably moving said seal toward and away from said opening, said screws supported by said hub, disposed around said shaft and rotatable with said hub.

7. A bearing as claimed in claim 6, wherein said sleeve extends parallel to said shaft and further includes a tapered surface adjacent said opening and a shoulder which is perpendicular to said rotating shaft, said tapered surface extending between said gap and said shoulder and facing a recess in said rotating shaft.

8. A bearing as claimed in claim 7 wherein said seal comprises a wedge having a first surface substantially parallel to an outer surface of said rotating shaft and a second surface substantially parallel to said tapered surface of said sleeve, said screws moving said first and second surfaces of said wedge into sealing contact with said rotating shaft and said sleeve.

* * * * *